US005652897A

United States Patent [19]
Linebarger et al.

[11] Patent Number: 5,652,897
[45] Date of Patent: Jul. 29, 1997

[54] ROBUST LANGUAGE PROCESSOR FOR SEGMENTING AND PARSING-LANGUAGE CONTAINING MULTIPLE INSTRUCTIONS

[75] Inventors: Marcia C. Linebarger, Upper Dublin Township; Lewis M. Norton, Tredyffrin Township; Deborah A. Dahl, Plymouth Township, all of Pa.

[73] Assignee: Unisys Corporation, Blue Bell, Pa.

[21] Appl. No.: 66,747

[22] Filed: May 24, 1993

[51] Int. Cl.⁶ ........................................... G06F 17/27
[52] U.S. Cl. ............................... 395/754; 395/751
[58] Field of Search ............ 364/419.05, 419.02, 364/419.08; 395/2.79, 2.84, 2.5, 2.59, 2.66, 2.64, 2.65

[56] References Cited

U.S. PATENT DOCUMENTS

| | | |
|---|---|---|
| 4,736,296 | 4/1988 | Katayama et al. . |
| 4,811,207 | 3/1989 | Hikita et al. . |
| 4,833,611 | 5/1989 | Fukumachi et al. ......... 364/419 |
| 4,839,853 | 6/1989 | Deerwester et al. . |
| 4,852,170 | 7/1989 | Bordeaux . |
| 4,866,670 | 9/1989 | Adachi et al. ................. 364/419 |
| 4,914,590 | 4/1990 | Loatman et al. ............... 364/419 |
| 4,930,071 | 5/1990 | Tou et al. . |
| 4,931,935 | 6/1990 | Ohira et al. . |
| 4,943,933 | 7/1990 | Miyamoto et al. . |
| 4,947,438 | 8/1990 | Paeseler . |
| 4,962,452 | 10/1990 | Nogami et al. ............... 364/419 |
| 4,974,191 | 11/1990 | Amirghodsi et al. . |
| 4,994,967 | 2/1991 | Asakawa . |
| 5,027,406 | 6/1991 | Roberts et al. . |
| 5,168,524 | 12/1992 | Kroeker et al. . |
| 5,197,005 | 3/1993 | Shwartz et al. . |
| 5,228,110 | 7/1993 | Steinbiss . |

OTHER PUBLICATIONS

Tsuboi et al., "A real-time task-oriented speech understanding system using keyword spotting", International Speech Conference on Acquostics, Speech and Signal Processing 92, 1:197–200 (Mar. 23, 1992).

S. Seneff "A Relaxation Method for Understanding Spontaneous Utterances" in *Proceedings of the DARPA Speech and Natural Language Workshop* (Morgan Kaufmann, Feb. 1992) pp. 299–304.

T. Strzalkowski "TTP: A Fast and Robust Parser for Natural Language" Tech Report, New York University Department of Computer Science, New York, New York, 1991.

T. Strzalkowski and B. Vauthey "Information Retrieval Using Robust Natural Language Processing" in *Proceedings of the Thirtieth Annual Meeting of the Association for Computational Linguistics* (1992), pp. 104–111.

(List continued on next page.)

Primary Examiner—Gail O. Hayes
Assistant Examiner—Frantzy Poinvil
Attorney, Agent, or Firm—John F. O'Rourke; Mark T. Starr; Steven R. Petersen

[57] ABSTRACT

Apparatus and method are provided for segmenting, parsing, interpreting and formatting the content of instructions such as air traffic control instructions. Output from a speech recognizer is so processed to produce such instructions in a structured format such as for input to other software. There are two main components: an instruction segmenter and a robust parser. In the instruction segmenter, the recognized text produced by the speech recognizer is segmented into independent instructions and each instruction is processed. The instruction segmenter receives a recognized air traffic control or other instruction, and segments it into individual commands. Utterances or other language are thereby broken up into their component instructions by detecting probable instruction boundaries. If normal processing fails, then robust backup processing is invoked, as a fallback after a fixed time per word has elapsed or a processing failure has occurred. The robust parser allows the system to extract information from utterances that are not necessarily well formed or may have extraneous comments in them.

7 Claims, 8 Drawing Sheets

OTHER PUBLICATIONS

E. Jackson, D. Appelt, J. Bear, R. Moore and A. Podlozny "A Template Matcher for Robust NL Interpretation" in *Proceedings of the DARPA Speech and Natural Language Workshop* (Morgan Kaufmann, Feb. 1991) pp. 190–194.

D. Stallard and R. Bobrow "Fragment Processing in the DELPHI System" in *Proceedings of the Speech and and Natural Language Workshop* (Morgan Kaufmann, San Mateo, California, 1992) pp. 305–310.

D. A. Dahl, L. M. Norton and N. N. Nguyen, "Air Traffic Control Instruction Monitoring Using Spoken Language Understanding" in *Proceedings of the 37th Annual Meeting of the Association of Air Traffic Controllers* (Air Traffic Association, Arlington, VA, Nov. 1992) pp. 819–824.

L. Hirschman, M. Palmer, J. Dowding, D. Dahl, M. Linebarger, R. Passonneau, F–M. Lang, C. Ball and C. Weir "The PUNDIT Natural–Language Processing Sytem" in *AI Systems in Government Conference*, Computer Society of the IEEE, Mar. 1989, pp. 234–243.

D. A. Dahl "PUNDIT: Natural Language Interfaces" in G. Comyn, N. E. Fuchs and M. J. Ratcliffe, eds. *Logic Programming in Action* (Springer–Verlag, New York, 1992).

L. Hirschman and J. Dowding, "Restriction grammar: A logic grammer" in P. Saint–Dizier and S. Szpakowicz, eds. *Logic and Logic Grammars for Language Processing*, (Ellis Horwood, New York, 1990) Chapter 7, pp. 147–167.

R. M. Weischedel and N. K. Sondheimer, "Meta–rules as a Basis for Processing Ill–Formed Input", in *American Journal of Computational Linguistics*, vol. 9, Nos. 3–4, pp. 161–177, Jul.–Dec. 1983.

P. J. Hayes and G. V. Mouradian, "Flexible Parsing", in *American Journal of Computational Linguistics*, vol. 7, No. 4, pp. 232–242, Oct.–Dec. 1981.

M. Abbott, "The use of speech technology to enhance the handling of electronic flight progress strips in an air traffic control environment" in *Voice Systems Worldwide* London, Media Dimenisons, May, 1990, pp. 126–134.

D. A. Dahl, "Spoken Language Applications in Air Traffic Control", in *Proceedings of Computing in Aerospace 8*, Oct. 1991.

K. Matrouf, J. L. Gauvain, F. Neel, and J. Mariani "An Oral Task–Oriented Dialogue for Air–Traffic Controller Training", in *SPIE* vol. 1293, *Applications of Artificial Intelligence VIII*, pp. 826–837, 1990.

E. Rich "Natural–Language Interfaces" in *Computer* vol. 17, No. 9, Sep. 1984, pp. 39–47.

M. Kao, N. Cercone and W–S Luk "Providing Quality Responses with Natrual Language Interfaces: The Null Value Problem" in *IEEE Transactions on Software Engineering*, vol. 14, No. 7, Jul. 1988, pp. 959–984.

D. A. Dahl and C. N. Ball "Reference Resolution in PUN-DIT" in P. Saint–Dizler and S. Szpakowicz, eds. *Logic and Logic Grammars for Language Processing* (Ellis Horwood, New York, 1990) Chapter 8, pp. 168–184.

L. M. Norton, N. N. Nguyen, M. C. Linebarger and D. A. Dahl "Integrating Speech Recognition and Natural Language Understanding to Process Air Traffic Control Instructions" in *3rd Annual 1993 IEEE Mohawk Valley Section Dual–Use Technologies & Applications Conference: Information Management Collection Processing & Distribution May 24–27, 1993* (IEEE, Utica/Rome, NY, 1993), pp. 102–107.

P. H. Winston "Language Understanding" in *Artificial Intelligence*, 2nd ed. (Addison–Wesley, Reading, MA, 1984) pp. xv and 291–334.

L. Birnbaum and M. Selfridge "Conceptual Analysis of Natural Language" in R.C. Schank and C. K. Riesbeck, eds., *Inside Computer Understanding: Five Programs Plus Miniatures* (Lawrence Erlbaum Associates, Hillsdale, N.J., 1981), Chapter 13, pp. 318–353.

R.C. Schank and C.K. Riesbeck, eds., "Micro ELI" in *Inside Computer Understanding: Five Programs Plus Miniatures* (Lawrence Erlbaum Associates, Hillsdale, N.J., 1981) Chapter 14, pp. 354–372.

A. Barr and E.A. Feigenbaum, eds., "Understanding Natural Language" in *The Handbook of Artificial Intelligence*, vol. 1 (William Kaufmann, Los Altos, California, 1981), Chapter IV, pp. 233–321.

L. Hirschman, *Integrating Syntax, Semantics, and Discourse DARPA Natural Language Understanding Program* including three volumes: *Vol. 1. Technical Report* (NTIS Accession No. AD–A213 667, 1990), *Vol. 2. Documentation* (NTIS Accession No. AD–A213 668, 1990) and *Vol. 3. Papers* (NTIS Accession No. AD–A213 669, 1990), published by the National Technical Information Service (NTIS), Springfield, Virginia.

T. Strzalkowski, "TTP: A Fast and Robust Parser for Natural Language" in *Proceedings of the 14th International Conference on Computational Linguistics (COLING)*, Nantes, France, Jul. 1992.

K.N. Karna, "Artificial intellgence for man–machine interface" in *Computer*, vol. 17, No. 9, Sep. 1984, pp. 8–9.

R. Schank, "Intelligent Advisory Systems" In P.H. Winston and K.A. Prendergast, eds., *The A I Business: The Commercial Uses of Artificial Intelligence* (MIT Press, Cambridge, MA, 1984), Chapter 11, pp. 133–148.

L.R. Harris, "Natural Language Front Ends" in P.H. Winston and K.A. Prendergast, eds., *The AI Business: The Commerical Uses of Artificial Intelligence* (MIT Press, Cambridge, MA, 1984), Chapter 12, pp. 149–161.

P.H. Wintson and K.A. Prendergast, eds., "Work and Play: A Discussion" in *The AI Business: The Commercial Uses of Artificial Intelligence* (MIT Press, Cambridge, MA, 1984), Chapter 13, pp. 163–175.

P.H. Winston and R.H. Brown, eds. *Artificial Intelligence: An MIT Perspective*, vol. 1 (MIT Press, Cambridge, MA, 1979), pp. 179–252.

A. Barr and E.A. Feigenbaum, eds., "Understanding Spoken Language" in *The Handbook of Artificial Intelligence*, vol. 1 (William Kaufmann, Los Altos, California, 1981), Chapter V, pp. 323–361.

L. Hirschman, "A Meta–Rule Treatment for English Wh–Constructions" in *META 88: Proceedings of the Workshop on Meta–Programming in Logic Programming*, Jun., 1988.

L. Hirschman, "Natural Language Interfaces for Large–Scale Information Processing". In A. Gupta, ed. *Integration of Information Systems: Bridging Heterogeneous Databases* (IEEE Press, New York, 1989), pp. 308–314.

C.N. Ball, "Analyzing Explicitly–Structured Discourse in a Limited Domain: Trouble and Failure Reports". In *Proceedings of the DARPA Workshop on Speech and Language*, Mar. 1989.

J. Dowding, "Reducing Search by Partitioning the Word Network".

T. Finin, R. Fritzson and D. Matuszek, "Adding Forward Chaining and Truth Maintenance to Prolog". In *Proceedings of the Fifth IEEE Conference on Artificial Intelligence Applications,* Mar. 1989.

L. Hirschman, F.-M. Lang, J. Dowding and C. Weir, "Porting PUNDIT to the Resource Management Domain".

L. Hirschman, W.C. Hopkins and R.C. Smith, "Or-Parallel Speed-Up in Natural Language Processing: A Case Study", in R.A. Kowalski and K.A. Bowen, eds., *Logic Programming: Proceedings of the Fifth International Conference and Symposium* (MIT Press, 1988) pp. 263–279.

W.C. Hopkins, L. Hirschman, and R.C. Smith, "Or-Parallelism in Natural Language Parsing", in V. Kuman, P.S. Gopalkrishman, and L. Kanal, eds. *Parallel Algorithms for Machine Intelligence and Pattern Recognition* (Springer-Verlag, New York, 1989).

F.-M. Lang and L. Hirschman, "Improved Portability and Parsing Through Interactive Acquisition of Semantic Information". In *Proceedings of the Second Conference on Applied Natural Language Processing,* Austin, Texas, Feb., 1988.

M.C. Linebarger, D.A. Dahl, L. Hirschman and R.J. Passonneau, "Sentence Fragments Regular Structures" In *Proceedings of the 26th Annual Meetins of the Association of Computational Linguistics,* 1988.

R.J. Passonneau, "Getting at Discourse Referents". In *Proceedings of the 27th Annual Meeting of the Association for Computational Linguistics,* Vancouver, Jun., 1989.

R.J. Passonneau, "A Computational Model of the Semantics of Tense and Aspect". In *Computational Linguistics,* vol. 14, No. 2, Jun., 1988.

R.J. Passonneau, "Situations and Intervals". In *Proceedings of the 25th Annual Meeting of the Assocation for Computational Linguistics,* Stanford, CA., Jul., 1987.

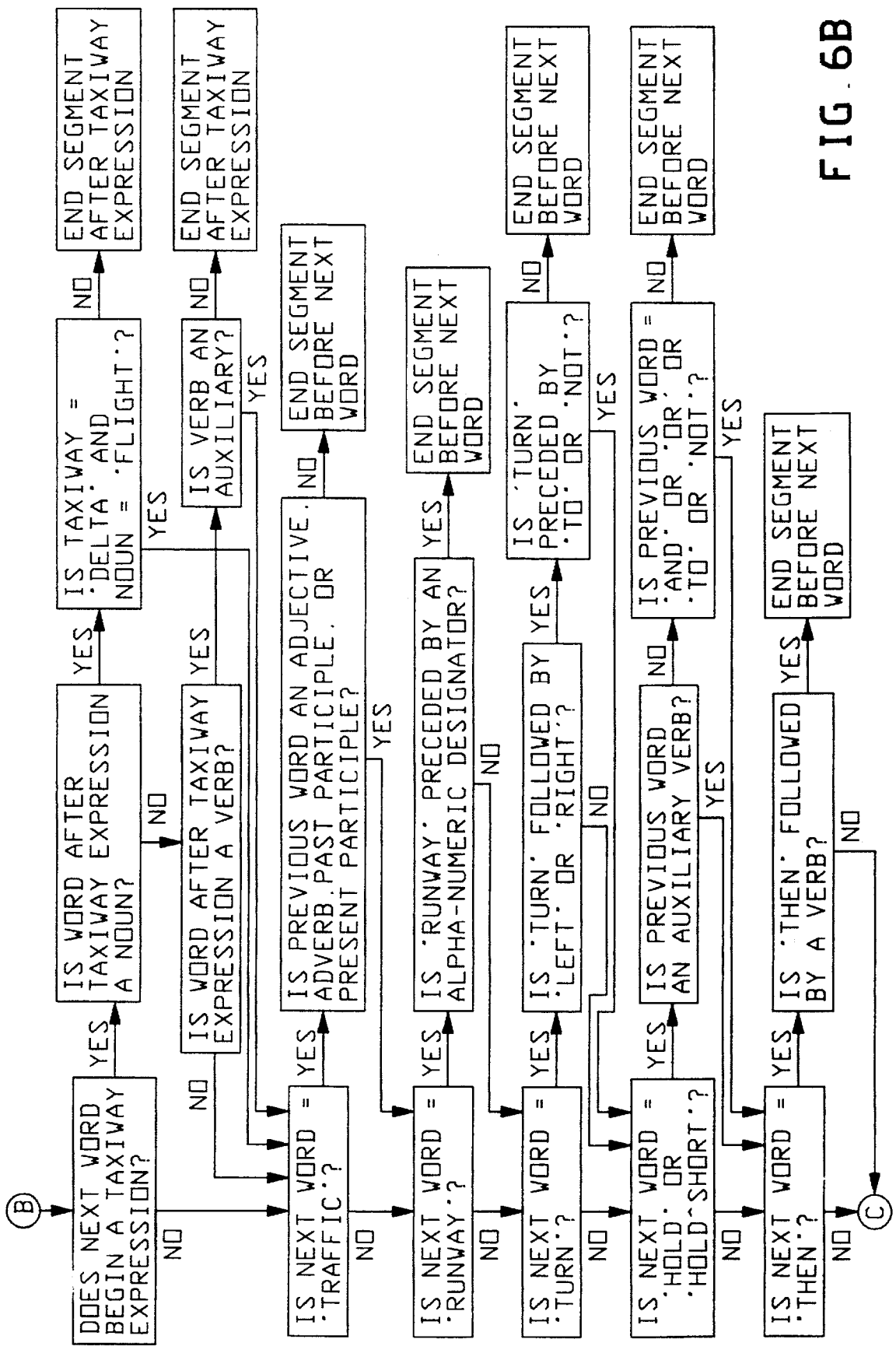

ROBUST LANGUAGE PROCESSOR FOR SEGMENTING AND PARSING-LANGUAGE CONTAINING MULTIPLE INSTRUCTIONS

A portion of the disclosure of this patent document contains material which is subject to copyright protection. The owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The present invention relates to information processing, and more particularly to language processing, natural language and natural language understanding and processing. The present invention also relates to computers and data processing systems, and more particularly to applications of same to social sciences such as linguistics, documentation or humanities.

BACKGROUND OF THE INVENTION

In general, speech recognition turns spoken words into written ones; natural language processing determines what the words mean and formats the meaning into appropriate data structures for further utilization. Air traffic controllers' instructions to pilots provide a rich source of information about the actions that pilots will be taking in response to these instructions. As such, air traffic control instructions could provide very useful information if they could be captured and entered automatically into an air traffic control (ATC) automation system. Furthermore, an extra layer of safety could thereby be provided by exploiting an additional source of information, based on the ATC instructions themselves. Because the vocabulary of air traffic control instructions is small and the different types of instructions are limited, air traffic control instructions are a good candidate for application of speech and natural language understanding technology because of the constrained nature of the domain.

In the past, automatic interpretation of air traffic control instructions in an operational setting was not feasible. Manual interpretation, while possible, is sporadic and expensive. Previous systems for automtically interpreting air traffic control instructions have required that the instructions conform to standard phraseology; thus they cannot be used in an operational setting, where instructions vary from the standard, but only for training purposes. Previous approaches to robust natural language processing have typically either focused solely on data from one domain or have implemented a domain-independent approach. Both of these alternatives have disadvantages. Approaches which have been tested on only a single domain cannot be guaranteed to be extensible to other domains. Entirely new approaches may then be required should the system be ported to another domain. On the other hand, the performance of domain-independent approaches may suffer in domain-specific applications because they are not able to use domain-specific knowledge to constrain the processing. Also, infrequent, hard-to-process inputs can require long processing times. These difficulties are overcome by the present invention.

SUMMARY OF THE INVENTION

Accordingly, a general purpose of the present invention is to provide apparatus and method for interpreting the content of speech or other language.

Another object of the present invention is to provide apparatus and method capable of enabling the content of spoken language to be captured in near real time, thereby making the content available for further analysis to detect problems, or for archival purposes.

A further object of the present invention is to provide apparatus and method for enabling the content of air traffic control instructions to be captured in near real time. As a consequence, the instructions are available for further analysis to detect problems, or for archival purposes. If a problem is detected, controllers can be warned, thereby improving ground safety and preventing accidents.

Still another object of the present invention is to provide apparatus and method for interpreting instructions such as air traffic control instructions even if they vary from the standard.

A still further object of the present invention is to provide apparatus and method capable of natural language processing such as parsing, robust parsing, last resort parsing, fragment parsing, processing of ill-formed input or flexible parsing.

Yet another object of the present invention is to provide apparatus and method for language understanding that is more efficient, more robust, and faster.

Briefly, these and other objects of the present invention are accomplished by apparatus and method for segmenting, parsing, interpreting and formatting the content of instructions such as air traffic control instructions. Output from a speech recognizer is so processed to produce such instructions in a structured format such as for input to other software. There are two main components: an instruction segmenter and a robust parser. In the instruction segmenter, the recognized text produced by the speech recognizer is segmented into independent instructions and each instruction is processed. The instruction segmenter receives a recognized air traffic control or other instruction, and segments it into individual commands. Utterances or other language are thereby broken up into their component instructions by detecting probable instruction boundaries. If normal processing fails, then robust backup processing is invoked, as a fallback after a fixed time per word has elapsed or a processing failure has occurred. The robust parser allows the system to extract information from utterances that are not necessarily well formed or may have extraneous comments in them.

Other objects, advantages and novel features of the invention will become apparent from the following detailed description of the invention when considered in conjunction with the accompanying drawings.

BRIEF DESCRIPTION OF THE DRAWINGS

In the drawings,

FIGS. 6A, 6B and 6C together constitute a flowchart or block diagram of one embodiment of an instruction segmenter according to the present invention.

DESCRIPTION OF THE PREFERRED EMBODIMENT

Figure 1:
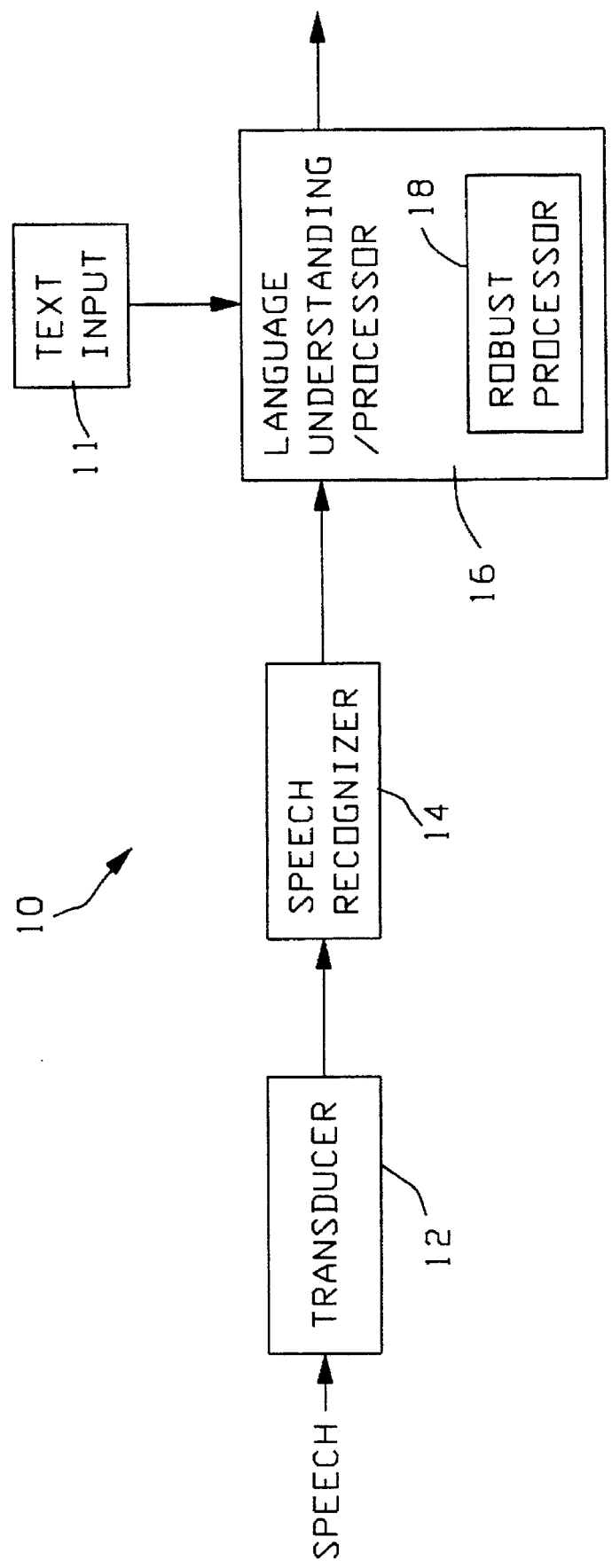
FIG. 1 is an overall block diagram of a language processor/analyzer according to the present invention.

Referring now to the drawings, wherein like reference characters designate like or corresponding parts throughout the several views, there is shown in FIG. 1 a language processor/analyzer 10 for receiving and processing spoken or written language such as ATC instructions. Processor 10 receives written input or text input via keyboard or other text input device 11. Processor 10 receives spoken language via a microphone or other speech-receiving device 12. The output of microphone 12 is provided to speech recognizer 14, which converts the spoken language into text words such as written words. The output of speech recognizer 14 is provided to language understanding/processor 16. The output of keyboard 11 is also provided to processor 16. Processor 16 can for example include a natural language processor. Processor 16 further includes a robust processor 18. Processor 16 analyzes the output of keyboard 11 and the output of speech recognizer 14, and converts that output into a more usable form. For example, the output of processor 16 could be provided to and utilized by an expert system that may also receive and utilize other inputs, and provides control functions such as feedback or an alarm to the source of the language received by microphone 12.

Figure 2:
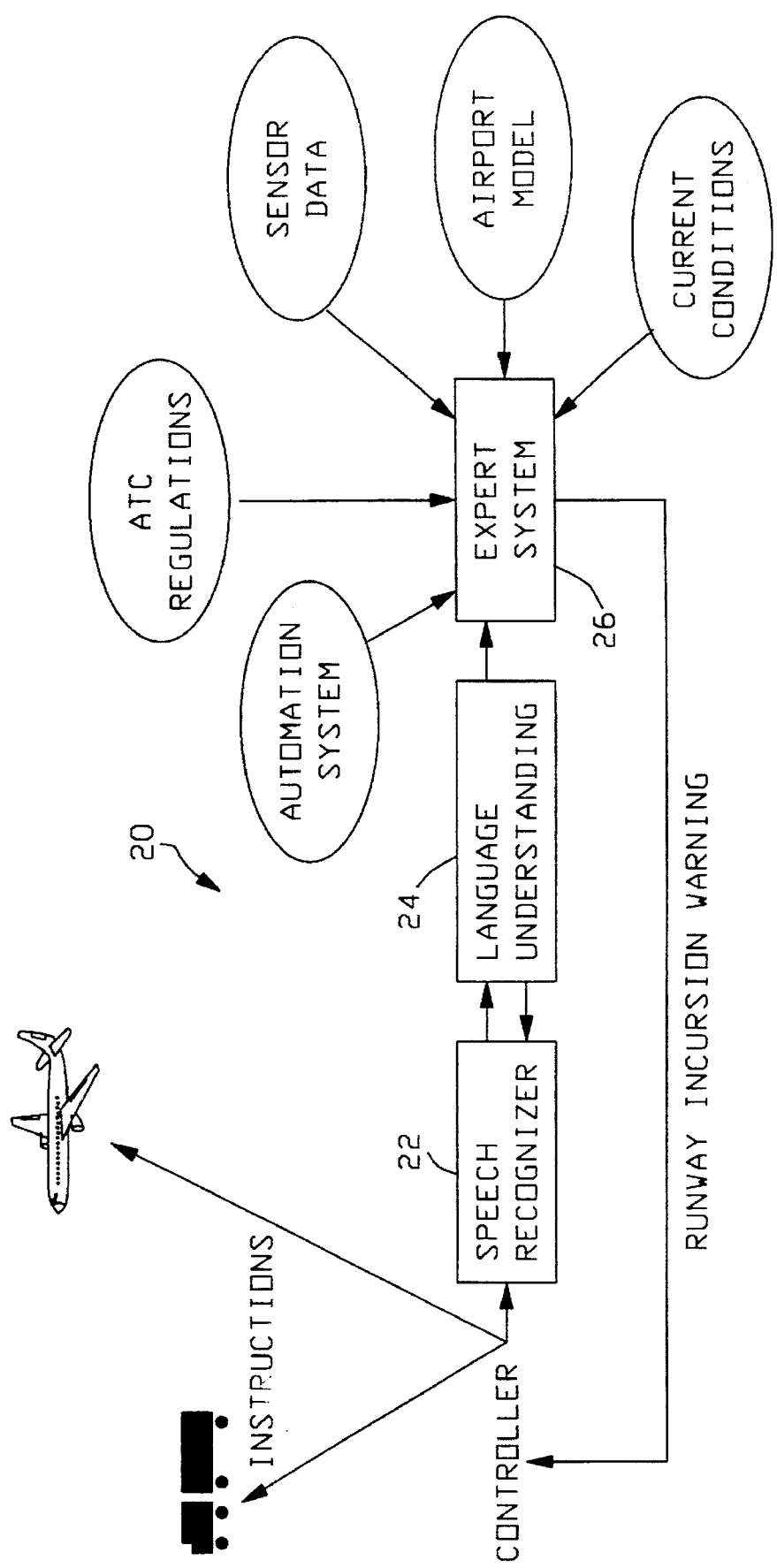
FIG. 2 is a block diagram of an air traffic control instruction monitoring system in which the present invention could be incorporated and utilized.

One example of apparatus incorporating such a processor 10 and such an expert system is shown in FIG. 2. There is shown in FIG. 2 an air traffic control instruction monitoring system 20 for monitoring instructions provided to aircraft and ground vehicles at an airport or similar installation. An automatic system for monitoring the instructions that air traffic controllers issue to pilots could greatly improve air safety in several ways. Such a system would allow very early detection of erroneous or conflicting instructions, even before pilots have had a chance to act on those instructions. Integrated with sensor data, it could allow the system to detect some failures of pilots to properly follow controllers' instructions. By simultaneously looking at outputs from multiple controllers, such a system could detect and flag conflicts between the instructions of multiple controllers. The system of FIG. 2 utilizes the technologies of speech recognition, natural language processing, and expert systems. Speech recognition captures the controllers' spoken instructions and converts them into words. Speech recognition refers to the process of converting an acoustic signal to text. Natural language processing converts text to a structured and unambiguous representation of the meaning of the text. Natural language processing extracts the specific instructions from the words and converts them into a formatted representation which can then be manipulated, such as by other software. Expert system technology determines the safety implications of the instructions in the context of previous instructions, sensor data, and the instructions of other controllers. FIG. 2 shows the overall flow of information through air traffic control instruction monitoring system 20, from a controller's instructions through the issuing of a warning. System 20 includes a speech recognizer 22, a language understanding system 24, and an expert system 26. Language understanding system 24 provides input to expert system 26 which integrates the information from verbal instructions with sensor data and other data to provide warnings about possible runway incursions.

The first step in understanding air traffic control instructions is to capture the voice instructions and turn them into written words. One example of a speech recognition system or speech recognizer that can be utilized as speech recognizer 14 of FIG. 1 or as speech recognizer 22 of FIG. 2 is SPHINX, developed at Carnegie-Mellon University and described in K. F. Lee, *Large Vocabulary Speaker-Independent Continuous Speech Recognition: The SPHINX System*, Ph.D Thesis, Carnegie-Mellon University, 1988, which is hereby incorporated by reference herein. However, other speech recognizers than SPHINX can be utilized with the present invention.

Once the speech recognizer 14 or 22 has produced a string of (written) words corresponding to the spoken input, it is the task of the language understanding system 24 to determine the meaning of the utterance. Language understanding system 24, and processor 16, are preferably natural language understanding (NLU) systems.

Figure 3:
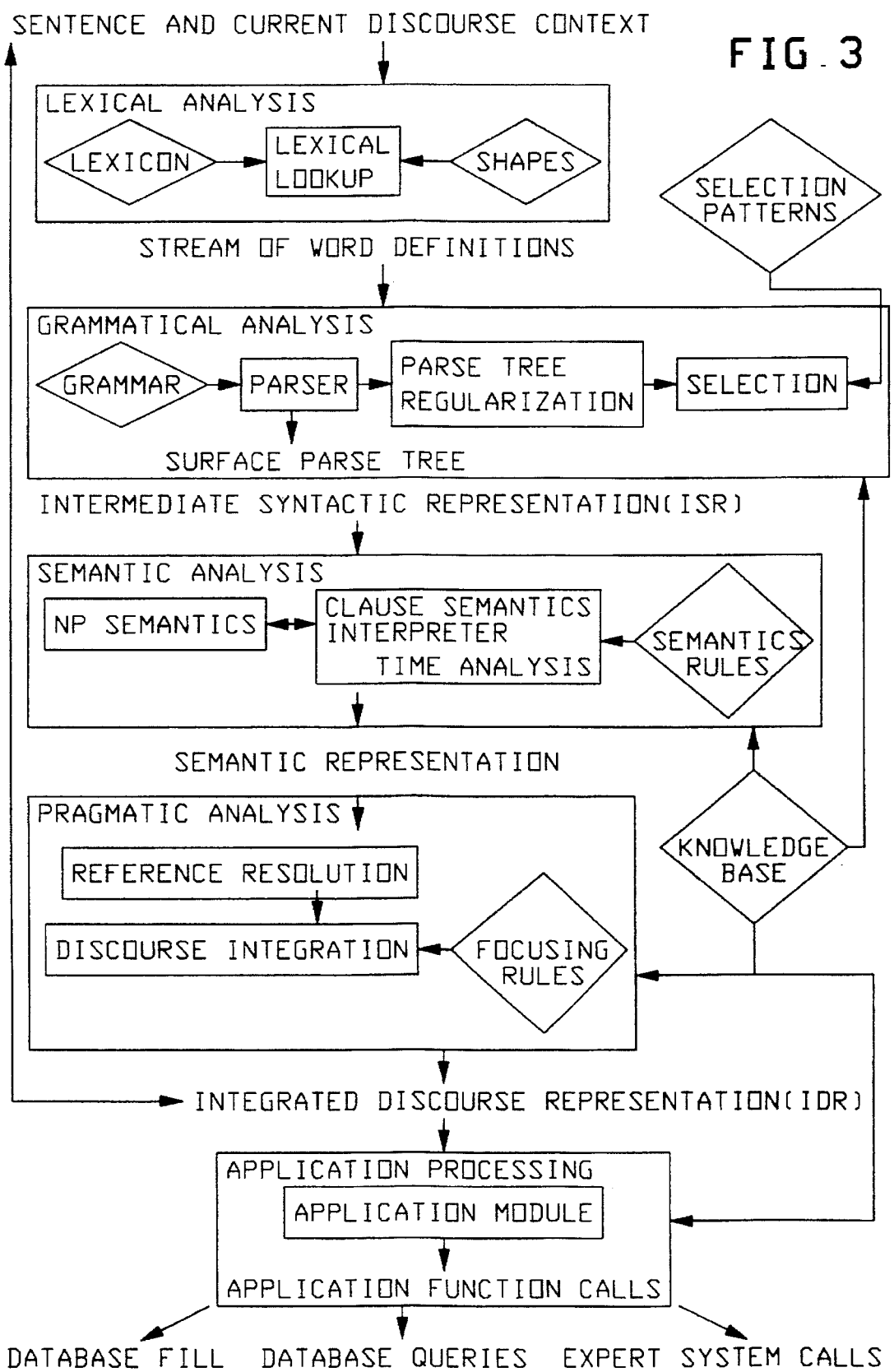
FIG. 3 is a flowchart for one example of a natural language processor that can be utilized with the present invention.

One example of a natural language understanding system such as could be utilized as (or as part of) processor 16 of FIG. 1 or language understanding system 24 of FIG. 2 is called PUNDIT (Prolog UNDerstander of Integrated Text), described in L. Hirschman, M. Palmer, J. Dowding, D. Dahl, M. Linebarger, R. Passonneau, F. M. Lang, C. Ball and C. Weir "The PUNDIT Natural-Language Processing System" in *AI Systems in Government Conference*, Computer Society of the IEEE, March 1989, and in D. A. Dahl "Pundit: Natural language interfaces" in G. Comy, N. E. Fuchs and M. J. Ratcliffe, eds. *Logic Programming in Action* (Springer-Verlag, New York, 1992), which are each hereby incorporated by reference herein. FIG. 3 is a flowchart for PUNDIT. PUNDIT consists of three relatively independent modules which perform, respectively, lexical lookup, syntactic analysis, and semantic interpretation.

The system of FIG. 2 is further described in D. A. Dahl, L. M. Norton and N. N. Nguyen, "Air Traffic Control Instruction Monitoring Using Spoken Language Understanding" in *Proceedings of the 37th Annual Meeting of the Association of Air Traffic Controllers* (Air Traffic Control Association, Arlington, Va., November 1992), pages 819–824, which is hereby incorporated by reference herein.

PUNDIT is also described in L. Hirschman *Integrating Syntax, Semantics, and Discourse DARPA Natural Language Understanding Program* including three volumes: Volume 1. *Technical Report* (NTIS Accession No. AD-A213 667, 1990), Volume 2. *Documentation* (NTIS Accession No. AD-A213 668, 1990) and Volume 3. *Papers* (NTIS Accession No. AD-A213 669, 1990), published by the National Technical Information Service (NTIS), Springfield, Va., which are hereby incorporated by reference herein. PUNDIT is a product of Paramax Systems Corporation, a subsidiary of Unisys Corporation. Although the use of PUNDIT is preferred, other natural language understanding programs could be utilized instead, such as Alvey, available from the University of Edinburgh, Scotland.

The PUNDIT lexical lookup module accesses a machine readable dictionary to associate with each word such information as its part-of-speech, root form, number, etc. For example, lexical lookup determines that the word "flights" is a plural noun whose root is "flight". After lexical lookup, the syntactic structure of the input is determined. This involves identifying the main verb, the subject, any objects, prepositional phrases, etc. Most ATC utterances are composed of more than one sentence, so that in general, each input is a sequence of commands, questions, and/or assertions. The PUNDIT semantic interpreter assigns meaning to the input utterance, with the help of a knowledge base (KB) of concepts, associations between KB concepts and words, semantic frames relating knowledge base concepts, and mapping rules restricting which syntactic constructions can be used to derive the instantiation of semantic frames.

Figure 4:
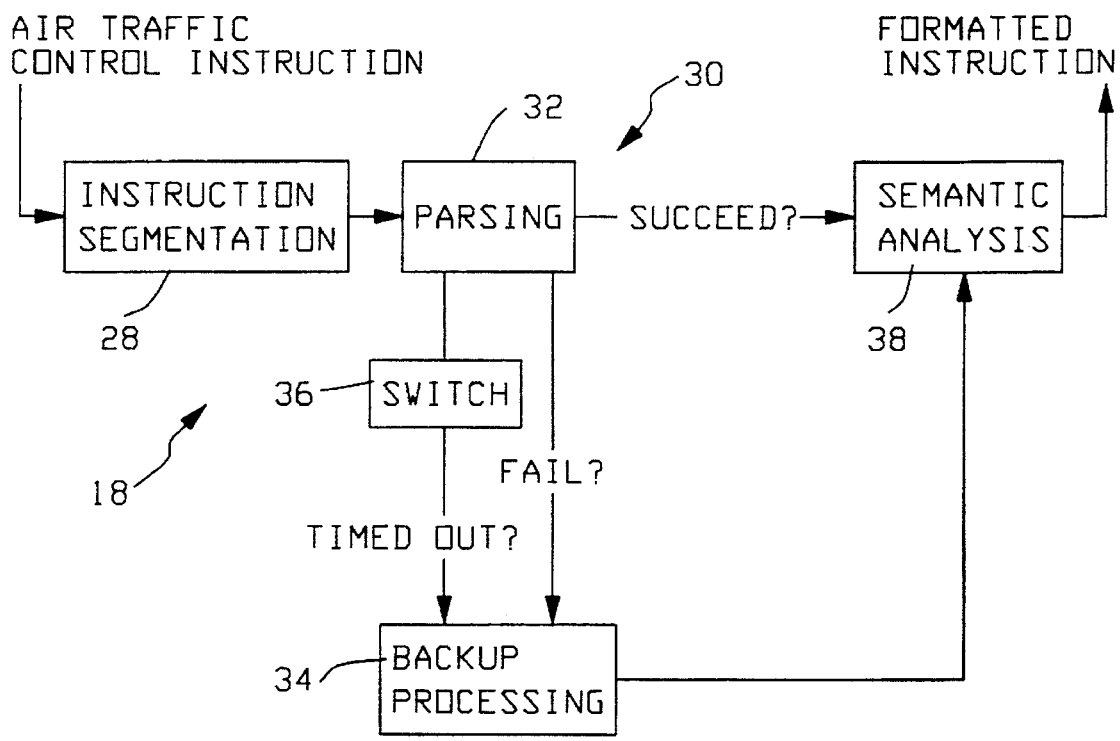
FIG. 4 is a block diagram of one embodiment of a robust processor according to the present invention.

Robust processor 18 of FIG. 1 is illustrated in greater detail in FIG. 4. Robust processor 18 includes instruction segmenter 28, and robust parser 30 including parser 32 and backup processor 34. Semantic analyzer 38 and parser 32 are preferably parts of a natural language understanding system such as PUNDIT or ALVEY. Parser 32 is preferably a top-down depth-first backtracking parser such as is described in A. Barr and E. A. Feigenbaum "Overview of parsing techniques" in *The Handbook of Artificial Intelligence, Vol.* 1 (William Kaufmann, Los Altos, Calif., 1981) and in L. Hirschman and J. Dowding, "Restriction grammar: A logic grammer" in P. Saint-Dizier and S. Szpakowicz, eds. *Logic and Logic Grammars for Language Processing,* pages 141–167 (Ellis Horwood, 1990), which are each hereby incorporated by reference herein. Parser 32 can be implemented in software; a preferred such implementation is given in the Prolog module "interpreter.pl" appearing on subsequent pages. Robust parser 30 also includes timeout switch 36, which provides the output of instruction segmenter 28 to backup processor 34 after a certain predetermined period of time per word (such as 1 second per word) has elapsed. As discussed above, processing begins with the output of a speech recognizer or with a text input. As shown in FIG. 4, the recognized text is segmented into independent instructions and each instruction is processed. If normal processing fails, then robust backup processing is invoked. Utterances in the ATC domain tend to be short sequences of several relatively independent commands. The range of possible commands is well-bounded, and air traffic controllers are trained to avoid expressing these commands in different phrasings. As a consequence, it is possible to separate utterances into their constituent commands with high reliability, and similarly, to resume processing at the next command if processing of the present command fails for any reason. Also, some commands may be irrelevant for a given application. For example, wind advisories could be ignored by an application only concerned with ground operations. A sample well-formed utterance follows:

Delta seven forty six turn right heading two seven zero cleared to land runway two nine left.

ATC utterances are broken into instructions by searching through the wordstream for words and word sequences which are diagnostic of the beginning or end of a command. Through careful analysis of air traffic control sentences, an appropriate set of words and word sequences has been selected. For example, verbs such as "contact", "maintain", "give way", "use", "join", "stay", and "go" are included in this set. Once the wordstream is broken up into probable compounds, each individual instruction is analyzed separately. The strategy of breaking the wordstream into compounds can reduce processing time, such as from an average of twelve seconds per utterance to an average of 1.6 seconds per utterance. Efficiency and speed of processing are thereby improved.

Multi-part utterances are typical of air traffic controller communication. Processing of such utterances is accomplished by the structure and method of FIG. 4. In the usual case, the controller will name the aircraft being addressed, and then issue a sequence of instructions. The instructions are issued in a manner based on a suggested phraseology which, while not adhered to unfailingly, provides the basis for clues which allow the system to separate the utterance into its component instructions. For example, the utterance "Canadian five zero five, Minneapolis tower, wind two five zero at seven, cleared to land runway two nine left." would come out of speech recognizer 14 as a string of nineteen words. There would not be any commas to assist in its partitioning. Instruction segmenter 28 splits this utterance into a sequence of two identifiers and two instructions, using its knowledge of the structure of typical controller utterances and their content. The two identifiers are straightforward to delimit, as long as the system expects that one or both of them will probably appear at the start of an utterance. This strategy based on keywords and local context around keywords is sufficient to divide the remainder into two instructions. For example, "wind" and "cleared" are very likely to begin instructional segments. Following partitioning, each instruction can undergo syntactic analysis independently. Instruction segmenter 28 thereby takes advantage of the characteristic sequential structure of air traffic control instructions. Instruction segmenter 28 improves processing time by preprocessing inputs to determine instruction boundaries.

The preferred rules for instruction segmentation employed by instruction segmenter 28 are listed in Table I.

TABLE I

1. The keywords "caution", "cleared", and "wind" unconditionally begin a new segment.
2. The keywords "contact", "double^back", "give^way", "go", "join", "maintain", "stay", "taxi", and "use" begin a new segment unless preceded by the words "to" or "not".
3. The word "turbulence" unconditionally terminates a segment.
4. The word "alert" terminates a segment unless followed by the word "heading".
5. Expressions denoting runways (e.g., runway 7, runway 22 right) terminate a segment if followed either by a noun other than "intersection" or a verb other than an auxiliary verb.
6. Expressions denoting taxiways (e.g., taxiway 3, taxiway bravo, hotel 3) terminate a segment if followed either by a noun or a verb other than an auxiliary verb. Exception is made for the taxiway denoted by "delta" because of the ambiguity with the airline name.
7. The word "traffic" begins a new segment unless preceded by an adjective, adverb, or past or present participle.
8. The keyword "runway" begins a new segment if preceded by an alpha-numeric designator.
9. The keyword "turn" begins a new segment if followed by the words "left" or "right", and not preceded by the words "to" or "not".
10. The keywords "hold" and "hold^short" begin a new segment unless preceded by an auxiliary verb or the words "and", "or", "to", or "not".
11. The word "then" begins a new segment if followed by a verb.
12. The Word "what" begins a new segment if followed by a tensed verb, and not preceded by a verb or a pronoun.
13. The keyword "follow" begins a new segment unless preceded by an auxiliary verb, pronoun, or the words "to" or "not" .
14. The contractions "you'll" and "you're" begin a new segment unless preceded by the words "when" or "if".
15. The word "I" begins a new segment if followed by a tensed verb or an adverb and a tensed verb.

Each of the rules of Table I are checked against the input to instruction segmenter 28. If the rule holds, then it is applied; otherwise, that rule is not applied.

Figure 6A:
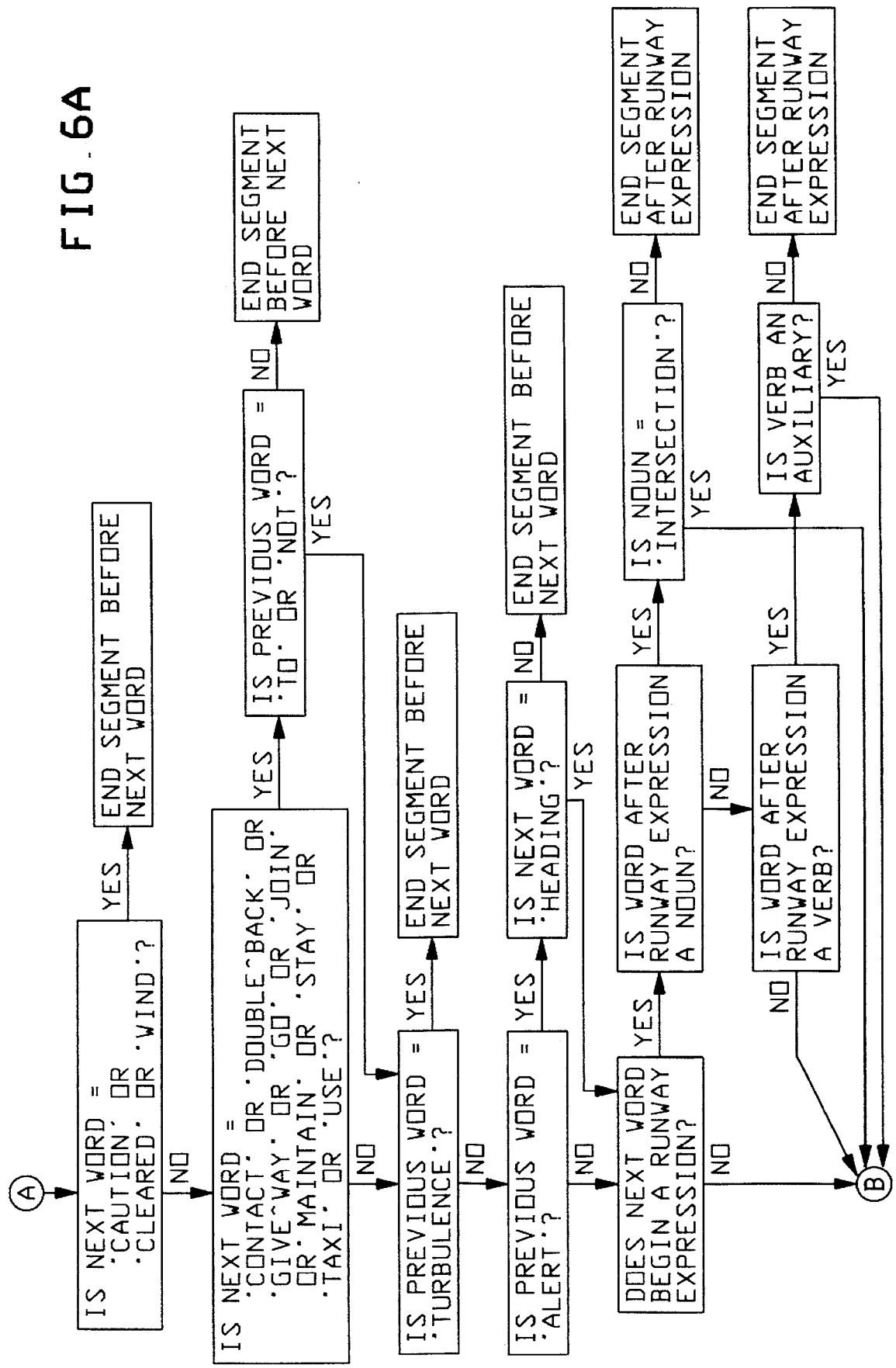
Figure 6C:
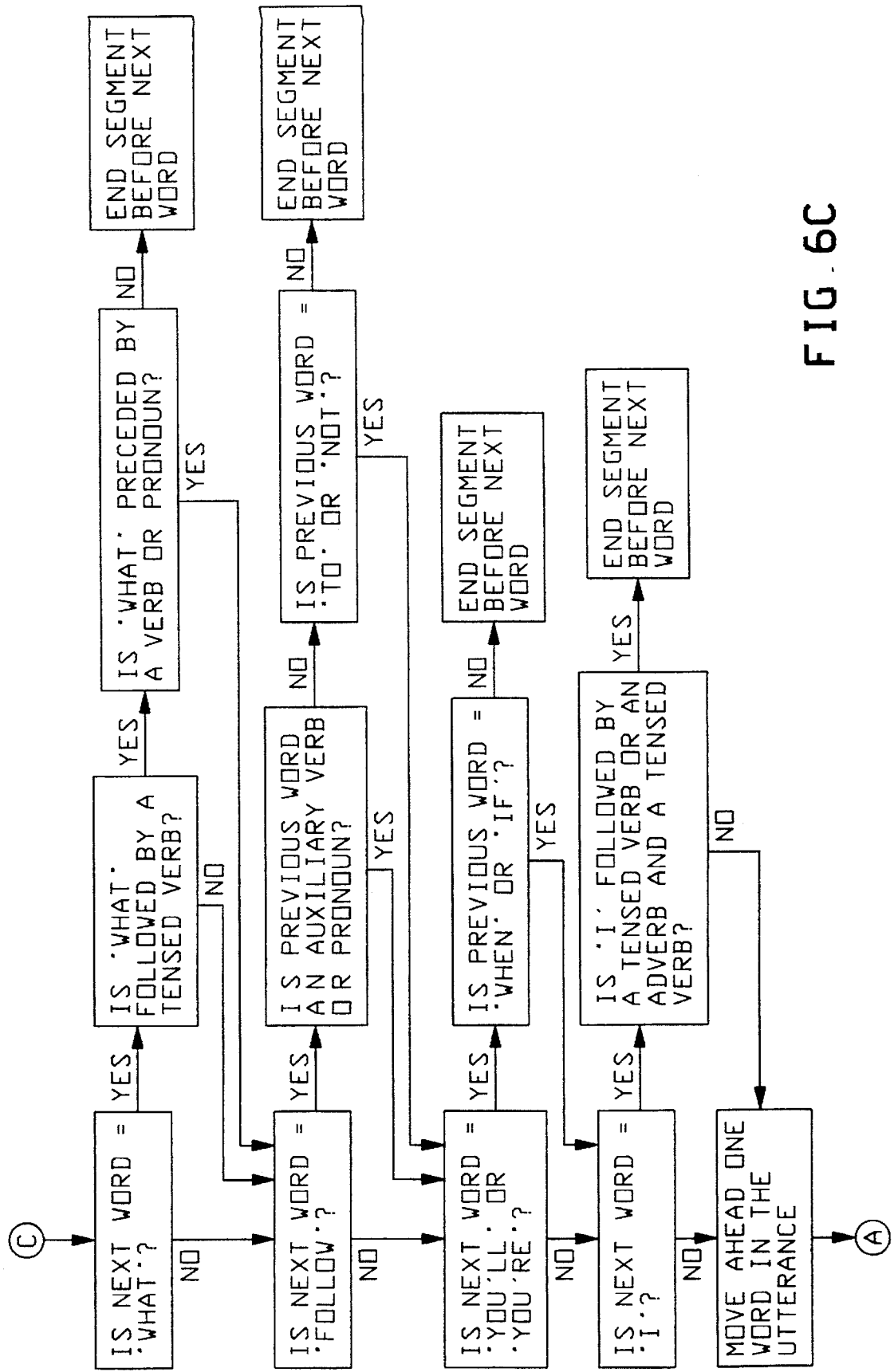

A flowchart for instruction segmentation by instruction segmenter 28 is given in FIGS. 6A, 6B and 6C. Instruction segmenter 28 can be implemented in software. An example of software, in PROLOG, is given in the "for obvious compound" portion of the module entitled "backup. pl" on subsequent pages. On the pages labeled "backup. pl", the instruction segementation code begins with the text "%% for obvious __ compound", and ends with "append (In, Storage, Out)." The flowchart for this code is given in FIGS. 6A, 6B, and 6C.

At the top level of the grammar (set of rules for the parser) used in this system there is a grammar rule for the highest level, or "center" node which is described in the following "backup. pl" module at the portion entitled "%% CENTER". This rule is always a disjunction of possible sentence types. For the ATC application domain, this rule includes disjuncts such as compounds and/or fragments. Robust parsing is implemented by adding one additional disjunct at the end of the center rule, the last resort "backup" option. The backup rule is entered either if normal parsing fails (i.e., none of the other disjuncts of the center rule produce a parse consuming the whole word string), or if timeout occurs. For timeout, a fixed amount of time is specified in the form of a number of seconds or fractional seconds per word, so that longer inputs are given more time. Once that time has expired, instruction segmentation ceases and no rule will execute except the backup rule, which will reallot time based on the length of the remaining word string, and then proceed as described below. Disjuncts are required to consume the whole input word string in order to succeed. The rule for backup has the following form. If the parser is at a keyword in the word string then being processed, reset the time allotment if necessary, then retry the other center options, relaxing the requirement to consume the entire word string. If a parse is then found, call the center rule on the remainder of the word string. However, if the parser is not then positioned at a keyword in that word string, or if a parse is not found in the previous step, then skip to the next keyword if any, reset the time allotment if necessary, and apply the center rule to the word string starting with the keyword. If no keyword is found, then a failure is indicated.

The opportunity for introducing ATC domain knowledge to influence the behavior of the backup rule comes in the specification of the keywords. The choices were dictated by the semantics of the possible commands which controllers may issue, and the normal phraseology (defined by the Federal Aviation Administration) for expressing those commands. Skipping to the next keyword is made equivalent to skipping to start of the next command. Most of the keywords are verbs, corresponding to the imperative form most often used to express commands. The following words have been designated as keywords in the air traffic control domain: "approach", "caution", "circle", "cleared", "come", "come back", "contact", "continue", "cross", "depart", "do", "double back", "follow", "give way", "go", "hold", "hold short", "join", "land", "left", "maintain", "make", "proceed", "right", "runway", "stay", "taxi", "taxiway", "turn", "use", "wind". As an example, backup is invoked in processing the ATC utterance "Northwest one thirty nine when you get established on the inner give way to the United trijet at Charlie twelve." The most important part of this utterance is the instruction to "give way to the United trijet at Charlie twelve". Backup processing ignores the clause "when you get established on the inner" because it is not part of the main instruction. The parse, analysis and resulting output for this sentence are shown in Table II.

TABLE II

| OPS: | imperative |
| VERB: | give+e,cir +ee way |
| SUBJ: | pro: you__flight |
| PP: | to |
| | the trijet (sing) |
| | MOD: pp: at |
| | nq: noun: taxiway (sing) |
| | nq__q([C12]) |
| | MOD: noun: proper:united+e,cir +ee airlines |
| VOC__FLIGHT:flight__exp: northwest+e,cir +ee airlines 139 |

The correctly formatted instruction output by the system:

NWA139 give way to UAL trijet

The system has thus been provided with a technique for robust processing so that utterances which fall outside of its current coverage can be partially interpreted. In robust processing, parser 32 is allowed to skip over words when it is unable to find a parse using every word. Skipping over words has also been implemented in the robust parsing strategies of S. Seneff "A Relaxation Method for Understanding Spontaneous Speech Utterances" in *Proceedings of the DARPA Speech and Natural Language Workshop* (Morgan Kaufmann, February 1992) pages 299–304, and T. Strzalkowski and B. Vauthey "Information Retrieval Using Robust Natural Language Processing" in *Proceedings of the Thirtieth Annual Meeting of the Association for Computational Linguistics* (1992), pages 104–111. The approach of FIGS. 5 and 7 differs from those of Seneff (supra) and Strzalkowski et al (supra) in that in addition to skipping, it also provides a simple way of taking domain-specific knowledge into account in the skipping process. That is, when an analysis is not possible using every word, the system begins searching through the wordstream for keywords (or words denoting key concepts), which are listed in a file. The use of keywords permits the system to make use of the domain-specific knowledge that certain words or concepts are important in the domain.

Because the backup mechanism is implemented by adding a single new BNF rule or grammar rule, identified as "backup" on subsequent pages, into the grammar or rules for parser 32, robust processing has been implemented in a natural language understanding system such as PUNDIT without losing the advantages of a broad-coverage syntactic grammar already in such a system. The other applicable parsing rules are given in modules "bnf.pl" and "oag__bnf.pl" appearing on subsequent pages. This is in contrast to approaches like the template matcher discussed in E. Jackson, D. Appelt, J. Bear, R. Moore and A. Podlozny "A Template Matcher for Robust NL Interpretation" in *Proceedings of the DARPA Speech and Natural Language Workshop* (Morgan Kaufmann, February 1991) pages 190–194 or the frame combiner discussed in D. Stallard and R. Bobrow "Fragment Processing in the DELPHI System" in *Proceeding of the Speech and Natural Language Workshop* (Morgan Kaufmann, San Mateo, Calif., 1992) pages 305–310 which are completely separate mechanisms from the standard linguistic processing components.

The output of the syntactic analysis module of PUNDIT, ALVEY or other NLU system utilized is thus a normalized representation of the structure of the input utterance, suitable as input to a semantic interpretation module. This representation is called an intermediate syntactic representation (ISR). When the ISR is complete, structure for each instruction has been identified, including subjects (e.g., "wind" in the first instruction), objects, prepositional phrases, both explicit (pp) and implicit (locP), and various modifiers. In the ISR, each word of the input has been positioned in relation to the remaining words in a manner consistent with the meaning of the utterance. Assigning meaning to the input utterance can then be performed by a suitable semantic analyzer or interpreter such as that provided by PUNDIT or ALVEY.

Figure 5:
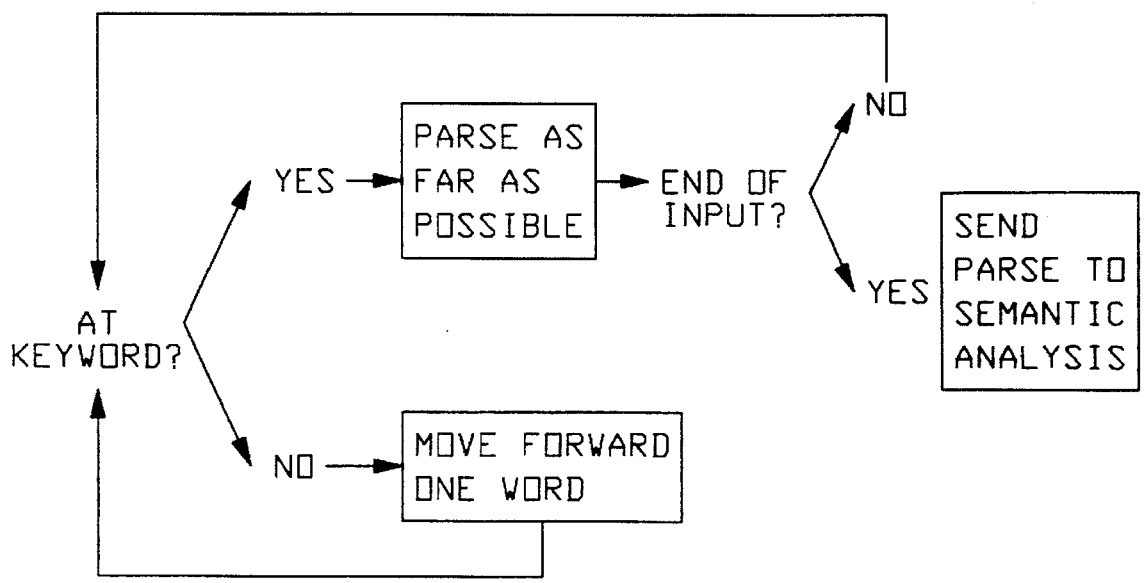
FIG. 5 is a block diagram of robust backup parsing according to the present invention.

Stages of backup processing for backup processor 34 are illustrated in FIG. 5. If parsing is at a keyword, then parsing proceeds as far as possible. If the end of the input has been reached, then the parse is sent to semantic analysis; otherwise, it is again determined whether the portion of the input being considered is at a keyword. If the input is not at a keyword, then the parsing moves forward one word and again considers whether a keyword is then present.

Figure 7:
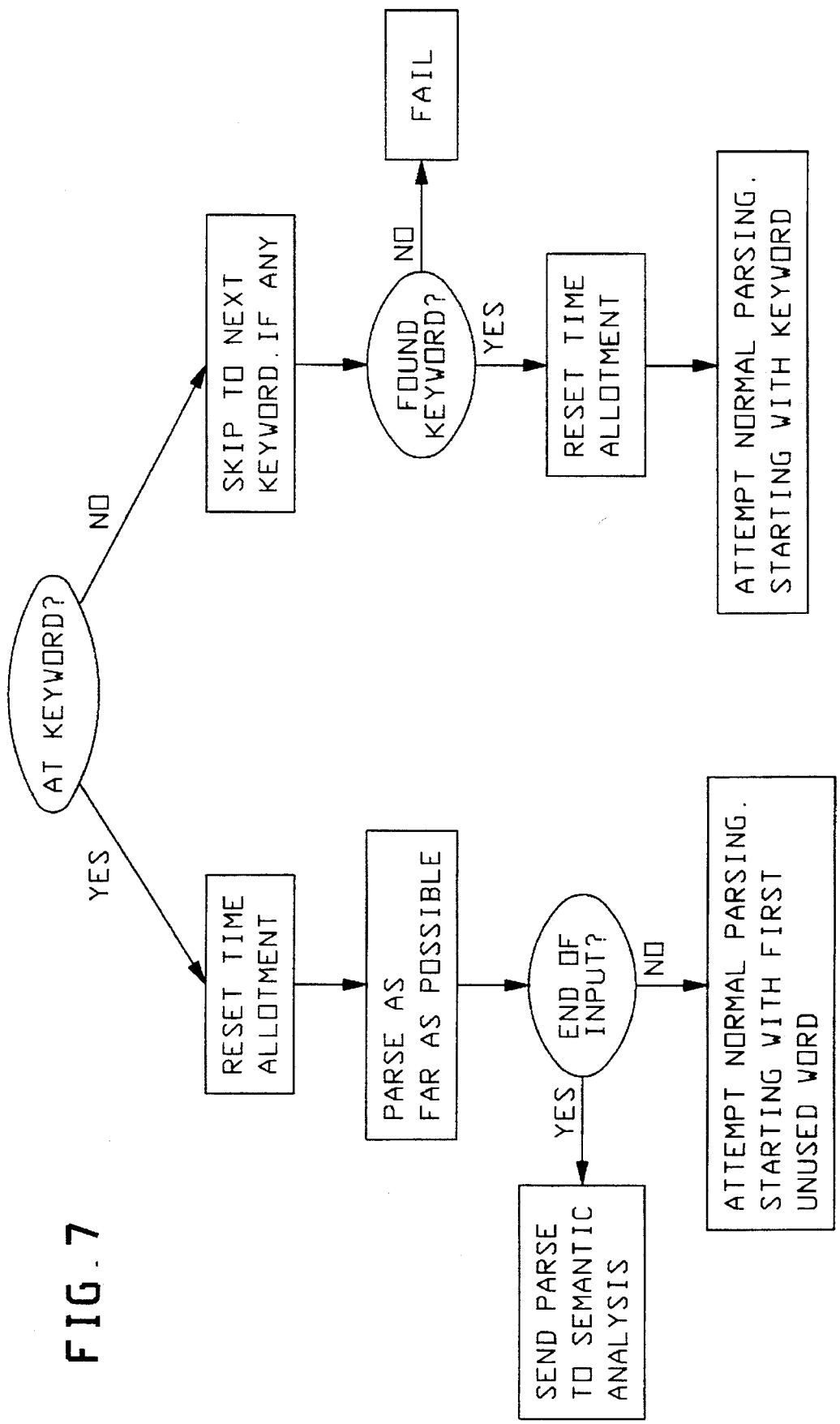
FIG. 7 is a block diagram or flowchart of one embodiment of a robust parser according to the present invention.

The processing of FIG. 5 is illustrated in greater detail at FIG. 7. When a timeout or failure occurs during parsing, backup processor 34 first considers whether the portion of the input then being considered by parser 32 is a keyword, defined above. If so, then backup processor 34 resets the time allotment, and parsing proceeds as far as possible. After that, if the end of the input has been reached, then the parsed input is provided to semantic analyzer 38; otherwise, normal parsing is attempted, starting with the first unused word. If the timeout or failure occurred other than at a keyword, then backup processor 34 skips to the next keyword, if any. Once such a keyword is found, then the time allotment is reset, and normal parsing is again begun, starting with that keyword. If a keyword is not found after so skipping to the end of the utterance, then a failure is indicated.

Backup processor 34 can be implemented in software. An example of such software is given in subsequent pages headed "backup.pl" at the portion beginning "%% for backup" and ending with "!." A list of backup keywords (discussed above) follows therein. The subroutine "backup" utilized therein is defined at the first page of "backup.pl" at "%%% BACKUP".

In the subsequent pages, the portions of the "backup.pl" module entitled "CENTER" and "BACKUP" are given in Restriction Grammar, a language for writing grammars. Restriction Grammar is an enhancement of the PROLOG language. The remainder of module "backup.pl", are written in PROLOG. The module "backup.pl" provides specific code for instruction segmentation and for robustness for parsing. The module "interpreter.pl", written in PROLOG, is a parser which interprets rules for robust processing (e.g. instruction segmentation and robust parsing) and other grammar rules indentified below. Modules "bnf.pl", "oag_bnf.pl" and "atc_bnf.pl", written in Restriction Grammar, provide context-free grammar rules for interpreting English-language sentences; of these modules, "atc_bnf.pl" is specific for air traffic control sentences. Modules "restrictions.pl", "oag-restrictions.pl" and "atc_restrictions.pl", written in Prolog, provide context-sensitive rules for interpreting English-language sentences; of these modules, "atc_restrictions" is specific for ATC sentences.

As discussed above, robust processor 18 can be implemented in software. An example of software, in the respective languages described above, is given in the following pages.

Some of the many advantages of the invention should now be readily apparent. For example, a novel robust air traffic control instruction interpreter and method have been provided which are capable of partitioning an ATC utterance into its component instructions, with provision made so that utterances which fall outside of its expected or normal coverage can be partially interpreted. Speed, efficiency and utility are thereby improved. The present invention processes spoken and written language so that its content can be captured in near real time, thereby making the content available for further analysis to detect problems, or for archival purposes. For air traffic control instructions in particular, if a problem is detected, then controllers can be warned, thereby improving ground safety and preventing accidents. The robust processing enables interpreting ATC instructions even if they vary from the FAA standard. The present invention segments, parses, interprets, and formats the content of air traffic control instructions, and can accept output from a speech recognizer and can output air traffic control instructions in a structured format for further utilization such as natural language processing.

Robust processor 18 is particularly robust in that parser 32 is allowed to skip over words in an intelligent fashion when it is unable to find a parse using every word. Skipping is an appropriate strategy for ATC data, because parsing failures tend to be due to extraneous material such as interpolated irrelevant comments and false starts. In contrast, relaxation of grammatical constraints is less appropriate for ATC data, since few parsing failures are due to violation of grammatical constraints. The present invention further differs from Seneff (supra) and Strzalkowski et al (supra) in that in addition to skipping, the present invention takes domain-specific knowledge into account in the skipping process. That is, when an analysis is not possible using every word, robust processor 18 begins searching through the word-stream for keywords (or words denoting key concepts), which are listed in a keyboard file. The use of keywords permits robust processor 18 to make use of the ATC domain-specific knowledge that certain words or concepts are important for ATC.

Because the backup mechanism is implemented by adding a single new BNF rule (module "backup") into the normal grammar of a natural language understanding system, robust processing has been implemented without losing the advantages of the broad-coverage syntactic grammar already in such a NLU system. This is in contrast to approaches like the template matcher discussed in Jackson et al (supra) and the frame combiner discussed in Stallard et al (supra) which are completely separate mechanisms from the standard linguistic processing components. As a consequence of this separation, the respective approaches of Jackson et al and Stallard et al require separate maintenance and development from the standard processing components.

In addition to inputs for which the system cannot find a parse using a standard NLU algorithm, there are also cases where a complete analysis would be too costly in terms of time. Robust processor 18 can also invoke backup in these cases, using a variation of the timeout mechanism described in T. Strzalkowski "TTP: A Fast and Robust Parser for Natural Language" Tech Report, New York University Department of Computer Science, New York, New York, 1991. Also see T. Strzalkowski, "TTP: A Fast and Robust Parser for Natural Language" in *Proceedings of the 14th International Conference on Computational Linguistics (COLING)*, Nantes, France, July 1992. Both of these Strzalkowski papers are hereby incorporated by reference herein. The Strzalkowski timeout mechanism allocates an absolute amount of time per sentence; in contrast, timeout in robust processor 18 allocates time as a function of the number of words in the input sentence so as not to penalize relatively longer sentences.

While the basic architecture of robust processor 18 is domain-independent, the approach also allows ATC domain-specific knowledge to assist in the processing.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. A computer-implemented method for robust language processing, comprising the steps of:

accepting language in text form;

segmenting the text language into one or more individual instructions, said segmenting being performed in accordance with predefined sets of rules and specific words that indicate at least the beginning or end of an instruction;

parsing the one or more individual instructions; and skipping one or more words in an instruction if a parse cannot be accomplished by said parsing step in a predetermined time or without a parsing failure;

wherein said parsing step and said skipping step together comprise the steps of:

first determining whether parsing is presently at any of at least one predetermined keyword;

if the portion of the instruction being parsed is not at any of the at least one predetermined keyword, then moving parsing ahead one word and repeating said first determining step;

if the portion of the instruction being parsed is at any of the at least one predetermined keyword, then parsing the instruction and second determining whether the end of the input has been reached; and if the end of the input has not been reached, then repeating said first determining step.

2. A method as defined in claim 1, further comprising the step of semantically analyzing the one or more parsed instructions.

3. A computer-implemented method for robust language processing, comprising the steps of:

accepting language in text form;

segmenting the text language into one or more individual instructions, said segmenting being performed in accordance with predefined sets of rules and specific words that indicate at least the beginning or end of an instruction;

parsing the one or more individual instructions; and skipping one or more words in an instruction if a parse cannot be accomplished by said parsing step in a predetermined time or without a parsing failure;

wherein, when a timeout or a failure occurs during parsing, said parsing step and said skipping step together comprise the steps of:

first determining whether the portion of the input then being considered for parsing is a predetermined keyword;

if said first determining step finds a predetermined keyword, then resetting the time allotment for timeout, and parsing as far as possible;

if said first determining step does not find a predetermined keyword, then performing one of the following processes: (1) skipping to the first of the next keyword or the end of the input, and then indicating a failure condition; and (2) resetting the time allotment for timeout and parsing the instruction starting with a predetermined keyword.

4. A computer-implemented method for robust processing of air traffic control (ATC) language, comprising the steps of:

segmenting the ATC language into individual instructions, said segmenting being performed in accordance with predefined sets of rules and specific words that indicate at least the beginning or end of an instruction; and parsing each individual instruction independently of one another, said parsing including skipping one or more words in an instruction if a parse cannot be accomplished in a predetermined amount of time or without a parsing failure; wherein said predetermined amount of time is a function of the length of the individual instruction;

wherein said parsing further comprises the steps of:

first determining whether parsing is presently at any of at least one predetermined keyword;

if the portion of the instruction being parsed is not at any of the at least one predetermined keyword, then moving parsing ahead one word and repeating said first determining step;

if the portion of the instruction being parsed is at any of the at least one predetermined keyword, then parsing the instruction and determining whether the end of the input has been reached; and if the end of the input has not been reached, then repeating said first determining step.

5. A computer-implemented method for robust processing of air traffic control (ATC) language, comprising the steps of:

segmenting the ATC language into individual instructions, said segmenting being performed in accordance with predefined sets of rules and specific words that indicate at least the beginning or end of an instruction; and parsing each individual instruction independently of one another, said parsing including skipping one or more words in an instruction if a parse cannot be accomplished in a predetermined amount of time or without a parsing failure; wherein said predetermined amount of time is a function of the length of the individual instruction;

wherein, when a timeout or a failure occurs during parsing, said parsing step further comprises the steps of:

first determining whether the portion of the input then being considered for parsing is a predetermined keyword;

if said first determining step finds a predetermined keyword, then resetting the time allotment for timeout, and parsing as far as possible;

if said first determining step does not find a predetermined keyword, then performing one of the following processes: (1) skipping to the first of the next keyword or the end of the input, and then indicating a failure condition; and (2) resetting the time allotment for timeout and parsing the instruction starting with a predetermined keyword.

6. A computer-implemented method for robust processing of air traffic control (ATC) language, comprising the steps of:

segmenting the ATC language into individual instructions, said segmenting being performed in accordance with predefined sets of rules and specific words that indicate at least the beginning or end of an instruction; and parsing each individual instruction independently of one another, said parsing including skipping one or more words in an instruction if a parse cannot be accomplished in a predetermined amount of time or without a parsing failure; wherein said predetermined amount of time is a function of the length of the individual instruction;

wherein said parsing is performed by a robust parser implemented in software, said robust parser comprising a main parser and backup processor for use when a parse cannot be accomplished by said main parser in a predetermined amount of time or without a parsing failure.

7. A method as defined in claim 6 wherein said main parser comprises a prescribed set of grammar rules for normal parsing and said backup processor is implemented as an additional rule in said set.

* * * * *